United States Patent
Wollensak et al.

[15] 3,678,112
[45] July 18, 1972

[54] PROCESS FOR PREPARING NUCLEAR ALKYLATED ANILINES AND RECOVERY OF ALUMINA

[72] Inventors: John C. Wollensak, Bloomfield Hills; John P. Napolitano, Royal Oak, both of Mich.

[73] Assignee: Ethyl Corporation, New York, N.Y.

[22] Filed: Feb. 4, 1970

[21] Appl. No.: 8,686

[52] U.S. Cl. ................................264/578, 23/143, 260/570 R, 260/570 D, 260/571, 260/575, 260/576, 260/577
[51] Int. Cl. ..............................................C07c 85/00
[58] Field of Search ...............260/578, 582, 570 R, 570 D, 260/571, 575, 576, 577

[56] References Cited

UNITED STATES PATENTS 3,275,690  9/1966  Stroh et al. ...........................260/578

Primary Examiner—Robert V. Hines
Attorney—Donald L. Johnson

[57] ABSTRACT

In a process for orthoalkylating an aromatic amine such as aniline by reaction of the aromatic amine with an olefin and a catalytic amount of an alkyl aluminum halide, the improvement whereby the catalyst is removed after the alkylation by adding to the reaction mixture aqueous caustic in an amount sufficient to provide from about 1.2–6 equivalents of caustic per equivalent of halogen, aging the caustic treated mixture at about 75°–175° C. for a period of from 15 minutes to 3 hours, separating the aqueous phase and adding to the aqueous phase at a temperature of about 20°–50° C. an amount of a weakly acidic material sufficient to reduce the pH to less than about 9.5, and then filtering off the precipitated alumina. This improved aluminum extraction process allows removal of the aluminum content of the alkylation in a readily recoverable, useful form.

10 Claims, No Drawings

PROCESS FOR PREPARING NUCLEAR ALKYLATED ANILINES AND RECOVERY OF ALUMINA

BACKGROUND

Aromatic amines are useful in a broad range of applications. For example, they are antiknock agents in gasoline used in spark ignited internal combustion engines. They are also valuable intermediates in the dye industry. They are beneficial when added to rubber wherein they prevent degradation caused by oxygen and/or ozone. Another use in particular for anilines substituted in the ortho position with an ethyl radical is in the preparation of indole and indole derivatives. For example, orthoethyl aniline is converted to indole by contact with a titanium dioxide catalyst at a temperature of around 600° C. (U.S. Pat. No. 2,886,573). Prior to the work of Kolka et al. (U.S. Pat. No. 2,814,646) no commercially practical method was known for the orthoalkylation of aromatic amines. Kolka et al. found that they could obtain good yields of orthoalkylated aromatic amines by reacting an olefin with an aromatic amine in the presence of an aluminum anilide. Another process employing an aluminum catalyst or a compound which will decompose to form metallic aluminum is described by Stroh et al. in U.S. Pat. No. 2,762,845. In application, Ser. No. 782,706, filed Dec. 10, 1968, is described a method of alkylating aromatic amines at a higher rate and using less catalyst through the use of an alkyl aluminum halide. The present invention is an improvement on that process.

SUMMARY

This invention relates to an improvement in the alkyl aluminum halide process of orthoalkylating aromatic amines. The orthoalkylation process comprises adding a catalytic amount of an alkyl aluminum halide to an aromatic amine having at least one hydrogen atom bonded to a nuclear carbon atom ortho to an amino group and having at least one hydrogen atom bonded to the amino nitrogen atom of said amino group, and heating the mixture with an olefin to a temperature of about 100°–500° C. In the improved recovery method the aluminum content of the reaction mixture after completion of the alkylation is recovered by the method comprising adding an aqueous alkali metal hydroxide solution to the reaction mixture after completion of the alkylation reaction in an amount sufficient to provide from about 1.2–6. equivalents of alkali metal hydroxide for each equivalent of halogen, aging the resultant mixture at about 75°–175° C. for a period of from about 15 minutes to 3 hours, removing the aqueous phase, adding to the aqueous phase at a temperature of from about 20°–50° C. a weakly acidic material until its pH is less than about 9.5, and then filtering the precipitated alumina from the aqueous phase. By this procedure, the alumina is readily filtered from the aqueous phase in a useful form consisting substantially of a mixture of boehmite and bayerite alumina.

The aromatic amines that can be used in the alkylation process can be mono- or poly-nuclear and also mono- or poly-amino as, for example, amino benzenes, amino naphthalenes, amino anthracenes, amino phenanthrenes, amino chrysenes, amino pyrenes, and the like. The aromatic amines can also have other nuclear substituents such as alkyl, aryl, alkaryl, aralkyl, cycloalkyl, substituted-cycloalkyl, halogen, alkoxy, aryloxy, and the like. Likewise, the nuclear substituents may form a closed ring such as in the case of indene. All that is required is that at least one position ortho to the amine radical is unsubstituted except for hydrogen, and that the amine nitrogen atom of said amine radical have at least one hydrogen atom bonded thereto. Of the various aromatic amines, the preferred are the mono-, di- or trinuclear amines. In particular, the amino benzenes are most useful.

Examples of suitable amines include:
  m-toluidine
  o-toluidine
  4-isobutylaniline
  4-sec-eicosylaniline
  N-methylaniline
  2-tert-butylaniline
  4-phenylaniline
  4-α-methylbenzylaniline
  4,4'-methylenebisaniline
  4,4'-isopropylindenebisaniline
  p-phenylenediamine
  N,N'-dimethyl-p-phenylenediamine
  6-sec-eicosyl-α-naphthylamine
  α-naphthylamine
  β-naphthylamine
  N-methyl-α-naphthylamine
  α-aminoanthracene
  3-aminophenanthrene
  7-aminoindene
  1-aminochrysene
  2-aminopyrene
  4-cyclohexylaniline
  4-phenylaniline The most preferred amines are the primary and secondary amino benzenes, referred to collectively as aniline. Examples of these are:
  aniline
  N-methylaniline
  N-ethylaniline
  p-sec-docosylaniline
  p-methoxyaniline
  p-bromoaniline
  N-butyl-m-bromoaniline Of these, the most preferred aromatic amine is aniline itself.

The alkyl aluminum halides added to the aromatic amines prior to reaction with olefins include any aluminum compound containing both an alkyl radical in which a carbon atom of the alkyl is bonded directly to an aluminum atom and also containing a halogen atom bonded directly to the aluminum atom. These include the dialkyl aluminum halides, the alkyl aluminum di-halides, and the alkyl aluminum sesquihalides. Some examples of suitable dialkyl aluminum halides are:
  dimethyl aluminum bromide
  diethyl aluminum bromide
  diethyl aluminum chloride
  di-n-propyl aluminum chloride
  diisobutyl aluminum iodide
  diisoamyl aluminum chloride
  di-n-dodecyl aluminum chloride
  dieicosyl aluminum bromide Examples of useful alkyl aluminum dihalides include:
  methyl aluminum dichloride
  ethyl aluminum dichloride
  ethyl aluminum dibromide
  n-propyl aluminum dichloride
  isobutyl aluminum dibromide
  n-hexyl aluminum dibromide
  sec-decyl aluminum di-iodide
  n-dodecyl aluminum dichloride
  n-eicosyl aluminum dibromide Both the above dialkyl aluminum halides and the alkyl aluminum dihalides are believed to exist in the form of dimers and these, of course, are included within the invention.

Alkyl aluminum sesquihalides have the empirical formula:

$$R_3 Al_2 X_3$$

in which R represents an alkyl group and X a halogen atom. Examples of useful alkyl aluminum sesquihalides include:
  methyl aluminum sesquichloride
  methyl aluminum sesquibromide    ethyl aluminum sesquichloride
  ethyl aluminum sesquibromide
  ethyl aluminum sesquiiodide
  n-propyl aluminum sesquichloride
  n-propyl aluminum sesquibromide
  isobutyl aluminum sesquichloride
  isobutyl aluminum sesqui-iodide
  n-hexyl aluminum sesqui-iodide
  n-decyl aluminum sesquichloride
  n-dodecyl aluminum sesquibromide sec-eicosyl aluminum sesquichloride The above alkyl aluminum halides can be used individually or can be added to the aromatic amine as mixtures with good results. Frequently, due to their tendency to ignite on exposure to air, they are used in the form of solutions in inert solvents such as hydrocarbons or ethers. Particularly useful solvents are the hydrocarbons such as hexane, heptane, isooctane, benzene, toluene, xylene, and the like.

Although the preferred catalysts are the alkyl aluminum halides, the process can also be carried out using aryl aluminum halides and, hence, these are considered equivalents. The alkyl aluminum halides are more readily available and are, accordingly, preferred.

The amount of alkyl aluminum halide added should be a catalytic amount. This means it should be sufficient to cause the olefin to alkylate the aromatic amine at a satisfactory rate under the reaction conditions employed. At higher temperatures and/or higher olefin concentrations, less catalyst is required. In general, good results are obtained if sufficient alkyl aluminum halide is added to the aromatic amine to provide one gram atom of aluminum for each 5–40 gram moles of aromatic amine, although more or less can be used. A most preferred operating range in the amount sufficient to provide one gram atom of aluminum for each 7–25 gram moles of aromatic amine.

The olefins useful in the process include olefins which are both mono- or poly-unsaturated, cyclic or acylic, substituted or unsubstituted, and both terminal and internal olefins. Examples of acyclic monoolefins are ethylene, propylene, butene-1, butene-2, isobutene, pentene-1, isopentene, pentene-2, hexene-1, hexene-2, 2-methyl pentene-1, 2-methyl pentene-2, n-decene-1, 2-ethyl octene-1, 2-ethyl octene-2, n-decene-2, dodecene-1, 2-ethyl decene-1, 2-ethyl decene-2, dodecene-2, octadecene-1, octadecene-2, 2-methyl heptadecene-1, diisobutylene, eicosene-1, eicosene-2, 2-ethyl octadecene-1, docosene-1, docosene-2, tria-contene-1, 2-ethyl octacosene-1, tetracontene-2, pentacontene-1, and the like.

Examples of cyclic monoolefins are cyclopentene, cyclohexene, cyclooctene, 1-methylcyclohexene, 1-butylcyclohexene, 1-methylcyclooctene, and the like.

Useful acyclic polyenes include 1,3-butadiene, 2-methyl-1,3-butadiene, 2,3-dimethyl-1,3-butadiene, 1,4-pentadiene, and the like. Some useful cyclic polyenes are cyclopentadiene, dicyclopentadiene, 1,3-cyclooctadiene, 1,3-cyclopentadiene, 1,4-octadiene, 1,3,5-cyclooctatriene, and the like.

The substituted olefins can have any substituents that do not interfere with the reaction. Examples of such substituents are halogens, alkoxy groups, aryloxy groups, aryl radicals, and the like. Illustrative examples of such olefins are 2-chloro-1,3-butadiene, vinyl chloride, allyl chloride, vinyl bromide, ethyl vinyl ether, phenyl vinyl ether, butyl vinyl ether, lauryl acrylate, methyl acrylate, indene, α-methyl styrene, 4-dodecyl styrene, 4-sec-octyl-α-methyl styrene, and the like.

In general, the most preferred olefin reactants are the acylic monoolefins containing from two to 50 carbon atoms, cyclic olefins containing from five to 10 carbon atoms, and aryl-substituted monoolefins containing from eight to 20 carbon atoms.

The amount of olefin added to the aromatic amine will vary depending upon whether mono- or di-alkylation is desired. The precise amount is not a critical feature of the process. In general, from about 0.5 mole equivalent to 8 mole equivalents of olefin are added for each mole of aromatic amine. A most useful range is from about one mole equivalent to 3 mole equivalents of olefin for each mole equivalent of aromatic amine.

The process proceeds best at elevated temperatures. A useful range is from about 100°–500° C. A preferred temperature range is from about 200°–400° C., and best results are usually obtained at about 300°–350° C.

The pressure under which the reaction is conducted is not an independent variable, and varies with the temperature and vapor pressure of the reactants. With the more volatile lower olefins such as ethylene, the reaction pressure will be quite high, while with the higher olefins only moderate pressures will be observed. Depending upon the reactants and the temperature, the pressure will range from about atmospheric to 2,500 psig.

The process should be conducted under a substantially inert atmosphere. Excessive amounts of oxygen or moisture will stop the alkylation. This is not to say that the reactants need be absolutely anhydrous, but only that they should be substantially anhydrous. Also, the amount of oxygen in the reaction vessel should be minimized, generally by flushing the reaction vessel with an inert gas such as nitrogen, methane, ethane or propane, prior to conducting the reaction.

The reaction can be conducted in the presence of an inert solvent. Suitable solvents include aromatic and aliphatic hydrocarbons. Examples of useful aromatic hydrocarbons are toluene, xylene, mesitylene, and the like. Examples of useful aliphatic hydrocarbons are hexane, n-octane, isooctane, decane, and the like.

It is generally preferred to first add the alkyl aluminum halide to the aromatic amine, heat the mixture, and then add the olefin over a period of time as the reaction proceeds. Variations of this sequence are possible which will accomplish similar results. For example, the olefin can be added to the aromatic amine followed by the addition of the alkyl aluminum halide. Likewise, the alkyl aluminum halide can be dissolved in the olefin and this solution added to the aromatic amine. These variations are all considered equivalents of the preferred method.

The reaction time will vary to some extent with the reactants used. A greater influence is exerted by the reaction temperature and the amount of alkyl aluminum halide added. The process should be conducted until the desired degree of orthoalkylation is attained. The progress of the reaction is readily monitored by periodically withdrawing samples and analyzing them by vapor phase chromatograph.

After completion of the alkylation reaction it is generally desirable to remove the aluminum contained in the reaction mixture. Although the alkylated aromatic amine product can be recovered from the reaction mixture by merely distilling or steam distilling directly from the reaction mixture containing the aluminum, this is not practical in large scale operations because of the resulting residue and also, in the case of direct distillation, the presence of some dealkylation. In the past, aluminum has been removed from a similar alkylation mixture in which an aluminum trianilide was employed as a catalyst by adding water and filtering off the precipitated aluminum hydroxide. Surprisingly, in the alkylation process using an alkyl aluminum halide catalyst the addition of water does not cause the precipitation of aluminum hydroxide unless it is subject to a long aging period and then it precipitates as a gel, which is impractical to filter. By following the procedure disclosed herein, the aluminum in the resultant alkylation mixture is not only removed from the alkylation mixture, but is recovered in the form of a readily filterable alumina, a valuable by-product.

As the first step in the aluminum recovery procedure, an aqueous base is added to the reaction mixture. Although a number of basic materials may be used such as sodium carbonate, potassium carbonate, and the like, the best results are obtained using an alkali metal hydroxide such as lithium hydroxide, sodium hydroxide, potassium hydroxide, and the like. Of these, sodium hydroxide is preferred. The concentration of the aqueous alkali metal hydroxide can vary over a wide range. Good results are achieved using from about a 1–20 weight per cent solution. A preferred concentration range is from about 5–10 weight per cent.

Since the alkylation procedure requires the addition of alkyl aluminum halide to the aromatic amine, there will be some halogen in the final reaction mixture depending upon the amount and type of alkyl aluminum halide employed. The amount of aqueous alkali metal hydroxide added is a function of the halogen content. The amount of aqueous alkali metal hydroxide should be sufficient to provide from about 1.2–6 equivalents of alkali metal hydroxide for each equivalent of halogen in the reaction mixture. Greater amounts can be used, but this serves no useful purpose and is economically unattractive. For example, if the reaction mixture contains 10 moles of chlorine in whatever form, then from about 12-60 moles of alkali metal hydroxide should be added as an aqueous solution.

After the addition of the aqueous alkali metal hydroxide the entire mixture is stirred and heated to a temperature of about 75°-175b$L$. C. Temperatures above 100° C. will, of course, require a closed system to prevent loss of water. The entire reaction mixture is aged at about 75°-175° C. for a period of from about 15 minutes to 3 hours. This treatment extracts the aluminum into the aqueous phase in a form which allows easy phase separation. A preferred aging temperature is from about 90°-100° C., and a preferred aging period is from about 15-45 minutes. These conditions are especially preferred when the original reactants are aniline, ethylene and diethyl aluminum chloride.

Following the aging period the aqueous and organic phases are separated, either by allowing the aqueous phase to settle to the bottom or by such means as passing the mixture through a centrifuge. The aqueous phase containing substantially all of the aluminum is thereby removed from the organic phase.

The temperature of the aqueous phase is then adjusted to about 20°-50° C. and a weakly acidic material is added. Temperatures somewhat below 20° C. are operable, but temperatures above 50° C. should be avoided in order to obtain a filterable form of alumina in the precipitate. A more preferred temperature range for this operation is from about 20°-35° C.

The weakly acidic material can be a lower organic acid such as formic acid, acetic acid, propionic acid, butyric acid, and the like. These include organic acid containing one to four carbon atoms. It can also be an anhydride of a weak acid such as acetic anhydride, propionic anhydride, butyric anhydride, and the like. The normally gaseous anhydrides of weak acids are very useful such as hydrogen sulfide, sulfur dioxide, carbon dioxide, and the like. The most preferred weakly acidic material is carbon dioxide.

An amount of weakly acidic material sufficient to lower the pH of the aqueous phase to below about 9.5 is added. Preferably the amount should be sufficient to lower the pH below about 8.5 because this permits more complete aluminum recovery.

During the addition of the weak acid such as carbon dioxide a precipitate forms in the aqueous phase. This precipitate is easily removed by such standard means as filtration or centrifugation. The precipitate is an alumina. A substantial amount of this alumina has been identified by X-ray diffraction as the boehmite and bayerite forms of alumina.

The following examples serve to illustrate the manner in which the process may be conducted. All parts are by weight unless otherwise specified.

EXAMPLE 1

Alkylation Stage

Into a pressure vessel was placed 24,510 parts of aniline, following which the vessel was purged with nitrogen and sealed. While stirring, the aniline was heated to 128° C. and then 1,586 parts of diethyl aluminum chloride were added over a 25-minute period at 125°-146° C. The vessel was then pressurized with ethylene to 300 psig and heated to about 312° C. Ethylene feed was commenced, and 16,140 parts of ethylene were fed to the reaction at a temperature range of about 320°-340° C. Gas chromatographic analysis of the reaction mixture showed it to contain 91.1 per cent diethyl aniline.

Aluminum Recovery

The alkylated mixture was then cooled to about 100°C. and transferred to a second stirred vessel. Then, 13,770 parts of a 8.09 weight per cent sodium hydroxide solution (2 equivalents of sodium hydroxide per equivalent of chlorine) were added and the mixture stirred for 20 minutes at 93°-100° C. Stirring was stopped and the aqueous phase allowed to settle. The aqueous phase was then drained to another stirred vessel. It contained some solid material, but separated readily. The aqueous phase was cooled to 18° C. and carbon dioxide (solid) was added over a 1 hour period at 18°-32° C. The pH decreased during this period from 13.2 to 8.6 and a precipitate formed. The precipitate was filtered off and washed with hot water. It was dried and then identified by X-ray power diffraction as a mixture of boehmite and bayerite forms of alumina.

EXAMPLE 2

This experiment was conducted in the same manner as Example 1 except that the carbon dioxide was added to the aqueous phase at 24°-26° C. until the pH was 8.4. The resulting alumina precipitate was readily filtered off and dried.

EXAMPLE 3

In this example the alkylation is conducted as in Example 1. Following this, the mixture is cooled to 90° C. and 10,800 parts of a 15 weight per cent aqueous potassium hydroxide solution is added (2.2 equivalents KOH per equivalent of chlorine). The resulting mixture is stirred for one hour at 90° C. and then allowed to separate into two phases. The lower aqueous phase is removed and cooled to 35° C. Acetic acid is added at a temperature of 30-35 until the pH is 7.8. The aqueous phase is then filtered to recover the alumina.

Good results can also be obtained in the above example using other weakly acidic materials such as formic acid, propionic acid, butyric acid, hydrogen sulfide or sulfur dioxide.

EXAMPLE 4

In a pressure reaction vessel is placed 143 parts of β-naphthyl amine and 19 parts of ethyl aluminum sesquibromide. This mixture is heated to 100° C. and the pressure is vented. The vessel is flushed with ethylene and then pressurized to 100 psig with ethylene. It is then heated to 330° C. and pressurized to 750 psig with ethylene. After stirring for 2.5 hours under these conditions, it is cooled to 90° C. and vented. Then 120 parts of 10 per cent aqueous sodium hydroxide is added and the vessel sealed and heated to 125° C. It is stirred at this temperature for 15 minutes and then cooled and the aqueous phase allowed to separate. The aqueous phase is removed to a separate vessel. Sulfur dioxide is injected into the aqueous phase at 20°-25° C. until the pH drops to 7.5. The material is then filtered to remove the precipitated alumina.

The above alumina recovery procedure can be used when the aromatic amine alkylation involves other aromatic amines, alkyl aluminum halides or olefins such as those previously listed.

As stated previously, the orthoalkylated aromatic amines produced by this process are useful for many purposes such as antioxidants, antiozonants, antiknock agents for gasoline, and the like. When used as antioxidants or antiozonants, mainly in rubber, they are merely added to the substrate to be protected at concentrations of from about 0.1 to 3 weight per cent. A principal use for the aromatic amines is as chemical intermediates. For example, o-ethyl aniline is readily converted to indole, a valuable chemical compound, following the process of U.S. Pat. No. 2,886,573. The alkylated amines are also useful as intermediates for herbicides. For example, 2,6-dialkyl anilines such as 2,6-diethyl anilines may be used to prepare the plant growth regulators described in U.S. Pat. No. 3,403,994. Not only are the alkylated aromatic amines useful, but the aluminas removed by the present recovery procedure are useful for the many known applications for aluminas such as for catalyst supports in petroleum refining. They can also be used as raw material in the Hall process for making aluminum metal.

We claim:

1. In a process for the selective nuclear alkylation of an aromatic amine having at least one hydrogen atom bonded to a nuclear carbon atom ortho to an amino group and having at least one hydrogen atom bonded to the amino nitrogen atom of said amino group, said process comprising adding a catalytic amount of an alkyl aluminum halide to said aromatic amine and heating the mixture with an olefin to a temperature of from about 100°–500° C., the improvement whereby the aluminum contained in the reaction mixture after completion of the alkylation reaction is recovered by a procedure comprising:

A. adding an aqueous alkali metal hydroxide solution selected from lithium hydroxide, sodium hydroxide and potassium hydroxide to said reaction mixture in an amount sufficient to provide from about 1.2–6 equivalents of alkali metal hydroxide for each equivalent of halogen in said reaction mixture, B. aging the caustic treated mixture at about 75°–175° C. for a period of from about 15 minutes to 3 hours, C. removing the aqueous phase, D. adding to said aqueous phase at a temperature of from about 20°–50° C. a weakly acidic material selected from lower organic acids containing from one to four carbon atoms and their anhydrides and hydrogen sulfide, sulfur dioxide and carbon dioxide until the pH of said aqueous phase is less than about 9.5, and E. removing the precipitated alumina from said aqueous phase.

2. The process of claim 1 wherein said alkali metal hydroxide is sodium hydroxide.

3. The process of claim 2 wherein said aromatic amine is aniline, said olefin is ethylene and said alkyl aluminum halide is diethyl aluminum chloride.

4. The process of claim 3 wherein said aging in Step (B) is carried out at about 90°–100° C. for a period of about 15–45 minutes.

5. The process of claim 4 wherein said acidic material is carbon dioxide.

6. The process of claim 5 wherein said carbon dioxide is added to said aqueous phase at a temperature of about 20°–35° C. until the pH is below about 8.5.

7. The process of claim 2 wherein about 1.8–2.2 equivalents of sodium hydroxide are employed in Step (A) for each equivalent of halogen in said reaction mixture.

8. The process of claim 7 wherein said aging in Step (B) is carried out at a temperature of about 90°–100° C. for a period of from about 15–45 minutes.

9. The process of claim 8 wherein said acidic material is carbon dioxide.

10. The process of claim 9 wherein said carbon dioxide is added at a temperature of about 20°–35° C. until the pH is below about 8.5.

* * * * *

PO-1050
(5/69)

UNITED STATES PATENT OFFICE
CERTIFICATE OF CORRECTION

Patent No. 3,678,112  Dated July 18, 1972

Inventor(s) John C. Wollensak and John P. Napolitano

It is certified that error appears in the above-identified patent and that said Letters Patent are hereby corrected as shown below:

In the heading on the patent, at the line marked /52/:
"264/578" should read -- 260/578 --

Signed and sealed this 19th day of December 1972.

(SEAL)
Attest:

EDWARD M.FLETCHER,JR.                ROBERT GOTTSCHALK
Attesting Officer                    Commissioner of Patents